Patented Apr. 30, 1935

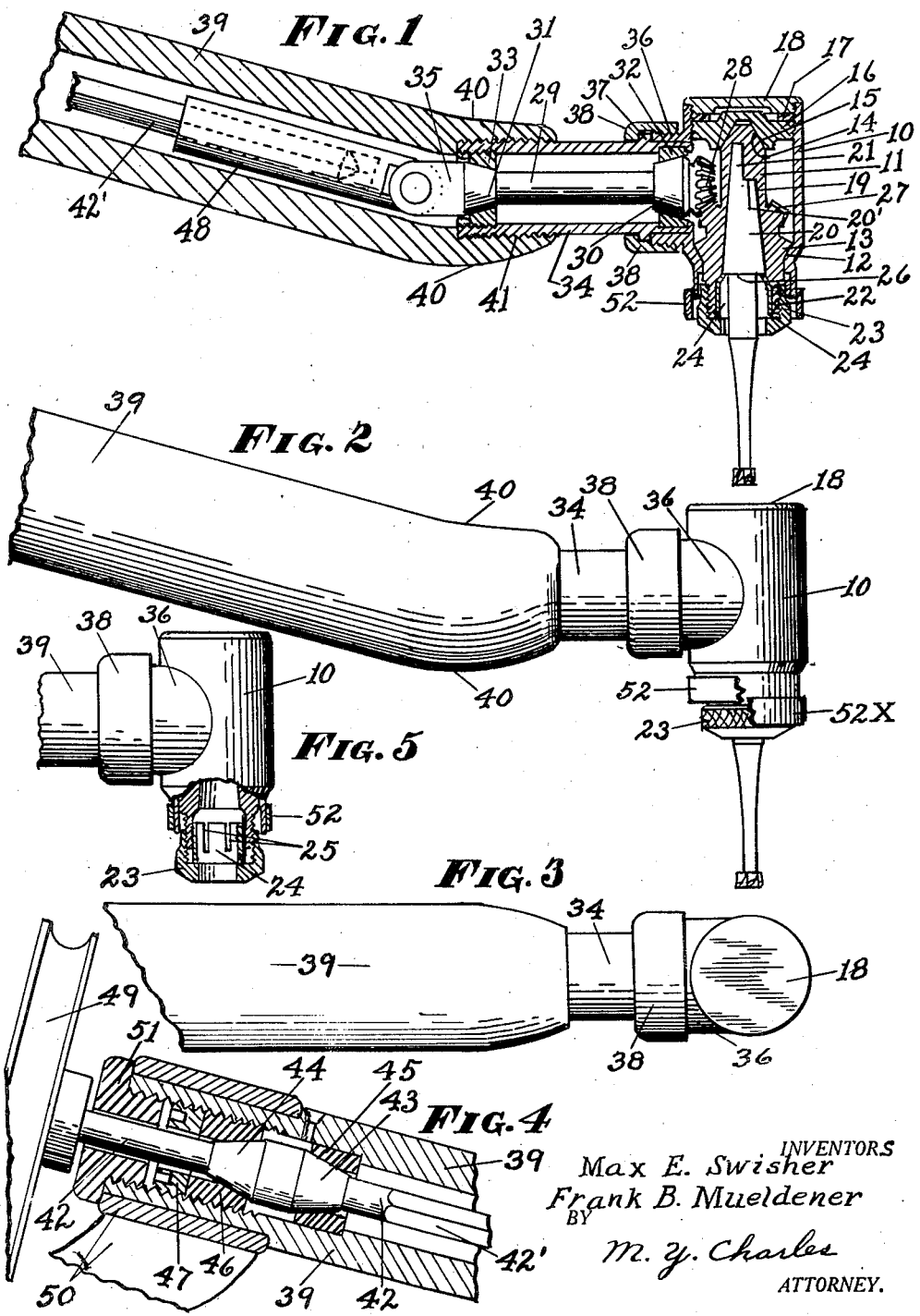

1,999,488

UNITED STATES PATENT OFFICE 1,999,488

DENTAL CONTRAANGLE HAND PIECE

Max E. Swisher and Frank B. Mueldener, Lyons, Kans.

Application April 11, 1933, Serial No. 665,494

4 Claims. (Cl. 32—27)

Our invention relates to an improvement in dental contra-angle hand pieces. The object of our invention is to provide a dental contra-angle hand piece having a burr chuck that is mounted in adjustable bearings so that vibration or looseness of the chuck may be taken out from time to time as the bearings may wear thereby providing a mechanism in which there is no play or lost motion. A still further object of our invention is to provide a means of positioning and maintaining the burr on the center axis of the burr chuck so there will be no wabble in the burr as it is revolved. A still further object of our invention is to provide a dental contra-angle hand piece that, while it is in operation, has no vibration, thereby obtaining maximum cutting results from the burr and at the same time tending to preserve the burr by making it do a continuous job of cutting instead of doing an intermittent job of cutting. A still further object is to provide a dental contra-angle hand piece that will do its work efficiently and at the same time reduce the pain inflicted on the patient which other hand pieces produce due to looseness of the burr chuck and the wabbling of the burr during the operation of cutting or drilling on the tooth. A still further object of our invention is to provide a hand piece of the kind described and in which the working parts may be well lubricated and so protected that the head of the hand piece may be dipped in any desired sterilizing liquid such as alcohol, etc., without affecting the working parts of the device. These and other objects will be more fully explained as this description progresses.

Now referring to the drawing in which like reference characters denote the same part throughout the several figures. Fig. 1 is a longitudinal sectional view of our improved dental contra-angle hand piece. Fig. 2 is a side view of our dental contra-angle hand piece. Fig. 3 is a plan view of Fig. 2. Fig. 4 is a longitudinal view of the outer end of the handle of our dental contra-angle hand piece and Fig. 5 is a view of the head piece with the burr removed therefrom and having parts broken away for convenience of illustration.

In the drawing is shown a housing 10 in which a burr chuck 11 is housed. At 12 is a tapered bearing formed in the housing 10 and on which rests the chuck 11 having a bearing 13 which is formed integral with the chuck 11. The upper end of the chuck 11 is tapered as shown at 14 and is seated in a tapered bearing 15 which is formed in a bearing plate 16 that is threaded into the housing 10 as a means of adjustment of the chuck bearings. At 17 is a lock ring which is threaded into the housing plate 16 as a means of locking the bearing plate in its adjusted position at 18 is a closure cap which is threaded into the upper end of the housing 10 and forms a tight joint therebetween to prevent sterilizing liquids from entering the housing at this point. The chuck element 11 is provided with a tapered hole 19 to receive a tapered burr end 20. The upper end of the burr end 20 is provided with a notch 20' and the hole 19 is fashioned to fit the upper end of the burr as a means of making the burr rigid in the chuck so when the chuck turns it will drive the burr and prevent its rotation in the chuck. On the lower end of the chuck 11 is integrally formed a sleeve like portion 22 on which is threaded a thumb nut 23. In the element 22 is a spring steel or brass tubular element 24 having a series of slots 25 therein. The lower end of the element 24 rests against the thumb nut 23. The interior of the upper end of the sleeve like element 22 is tapered or curved inward to meet the tapered chuck hole 19 so that the tapered portion 20 of a burr may be positioned in the hole 19 and by screwing the thumb nut 23 upward the element 24 is forced upward in the sleeve 22 and the upper ends of the element 24 are pinched together to catch on the shoulder 26 of the burr so that by further tightening of the thumb nut 23 the tapered end 20 of the burr will be forced and held solidly in the chuck hole 19 so that upon the rotation of the chuck the burr will revolve true on the vertical axis of the chuck and there will be no wabble or unevenness in the running of the burr.

To remove the burr from the chuck it is only necessary to screw the thumb nut downward and the spring of the upper ends of the element 24 will spread in the hole in the sleeve 22, slipping the element 24 downward against the thumb nut 23 whereupon the burr may be pulled out of the chuck hole 19.

At 27 is a bevel gear integrally formed on the chuck element 11 and is driven by a bevel pinion 28 which is rigidly mounted on a shaft 29 which is provided with tapered portions 30 which rest in a tapered bearing element 32. At 34 is a tubular element in the ends of which are carried the bearings 32 and 33. In one end of the element 34 is an enlarged portion into which bearing 32 is pressed and the end of the element 34 is peened or pressed over the end of the bearing 32 to rigidly secure the bearing in its proper position in the element 34. The opposite end of the element 34 is threaded, both internally and externally. The bearing 33 is threaded into the element 34 whereupon a universal joint element 35, on which is formed the tapered portion 31, is rigidly affixed by any suitable method, on the shaft 29 so that the tapered portion 31 bears in the bearing 33. The bearing 33 may be screwed backward or forward to secure proper adjustment of the bearings and prevent end play in the shaft 29 which will insure quiet running of the gears 27 and 28 and thereby eliminate all vibration.

At 36 is an outwardly projecting tubular portion that is integral with the housing 10, and is adapted to receive one end of the element 34. At 37 is a shoulder on the element 34 which rests against the outer end of the element 36. At 38 is a collar around the element 34, said collar being threaded on the element 36 so that when the collar is screwed down on the element 36 the shoulder 37 is rigidly bound and held between the collar and the outer end of the element 36. At 39 is a handle element, one end of which is curved, as shown at 40, to give an angle to the handle of the hand piece so as to make a convenient instrument to use. The handle 39 is hollow and is threaded on the element 34 as shown at 41.

There may be instances where it would be of advantage if the handle 39 could be positioned at an angle to a plane in which lies the center axis of the burr chuck 11. This can be accomplished by loosening the nut 38 and turning the handle 39 to the desired angle and then tighten the nut 38 to again rigidly hold the housing 10 in its positioned relation to the handle 39.

In the handle element 39 is a drive shaft 42 on which is formed oppositely bevelled portions 43 and 44, and in the element 39 is placed a bearing 45 in which rests the bevelled portion 43. At 46 is another bearing which is threaded into the element 39 and receives the bevelled portion 44 on the drive shaft 42. By screwing the bearing element 46 backward or forward adjustment of the bearings 45 and 46 on the cones 43 and 44 is accomplished. At 47 is a ring threaded into the handle element 39 and adapted to screw down against the bearing 46 as a means of locking the bearings in their adjusted position. As shown at 42' the drive shaft 42 is made square and is received in a square socket 48 which is a part of a universal joint above mentioned.

There are numerous methods that may be employed to transmit power to a dental hand piece as above described, such as by flexible drive cables in flexible tubes, or as probably most commonly used, a system of pulleys and belts and the like. As shown in the drawing 49 is a belt pulley which is adapted to be driven by a round belt which is not shown. The pulley 49 is rigidly mounted on the drive shaft 42. At 50 is a pulley bracket revolvably mounted on the handle 39 and held thereon by a nut 51 which is threaded into the handle 39 and retains the element 50 on the handle 39.

While the drawing shows a contra-angle hand piece it will be understood that a straight angle hand piece can be made and still embody the important features of our invention. It will be further understood that while we have shown a complete hand piece that our invention may be made to work in conjunction with, or fit on, equipment already in use, such as a drive from some source of power, etc.

The thumb nut 23 being threaded on the skirt element 22 of the chuck revolves with the chuck and would be annoying to the patient should the thumb nut contact another tooth or some adjacent part of the patient's mouth while the thumb nut is revolving, therefore we have provided a shield 52 which is a ring that may be slipped up or down on the lower end of the housing 10 to cover the thumb nut 23 as illustrated at 52x.

In the drawing the gears 27 and 28 are shown as being bevel gears although it will be understood that any desired type of gear may be used at this point such as spiral gears, worm drives or even friction type gears.

Such modifications of our invention may be employed as lie within the scope of the appended claims without departing from the spirit and intention of our invention. Now having fully described our invention, what we claim as new and desire to secure by Letters Patent is:

1. In a dental hand piece, said hand piece having a burr chuck housing, and a burr chuck therein, said burr chuck being rotatably held between two bearings, one of said bearings being stationary, the other bearing being threaded into said housing as a means of adjusting the bearings for the proper holding of said burr chuck, a lock ring, said lock ring being threaded into the burr chuck housing and being screwed against said adjustable bearing as a means of locking said adjustable bearing in its adjusted position, and means for tightly sealing the upper end of said burr-chuck housing, and means for rotating said burr chuck, said burr chuck having a tapered hole extending upward therein for the reception of a burr shank having a shoulder thereon, a sleeve integrally formed on the lower end of said burr chuck, a spring burr locking element in said sleeve, and means threaded on said sleeve for the operation of said spring burr locking element.

2. In a dental hand piece, said hand piece having a burr chuck housing, and a burr chuck therein, said burr chuck being rotatably held between two bearings, one of said bearings being stationary, the other bearing being threaded into said housing as a means of adjusting the bearings for the proper holding of said burr chuck, a lock ring, said lock ring being threaded into the burr chuck housing and being screwed against said adjustable bearing as a means of locking said adjustable bearing in its adjusted position, and means for tightly sealing the upper end of said burr-chuck housing, and means for rotating said burr-chuck, said burr chuck having means threaded on the lower end thereof for operating a device for locking a burr in said chuck.

3. In a dental hand piece as described in claim 1, a slip sleeve on the lower end of said burr chuck housing that will cover the said lock operating device substantially as shown and for the purpose set forth.

4. In a dental hand piece as described in claim 1, a handle for the support of said burr chuck housing and a swivel connection between said burr chuck housing and said handle and means for locking said burr chuck housing to said handle in any position, said burr chuck housing may be set.

MAX E. SWISHER.
FRANK B. MUELDENER.